Sept. 16, 1930.   J. S. WILLCOX ET AL   1,775,795
SAFETY VALVE
Filed June 11, 1925
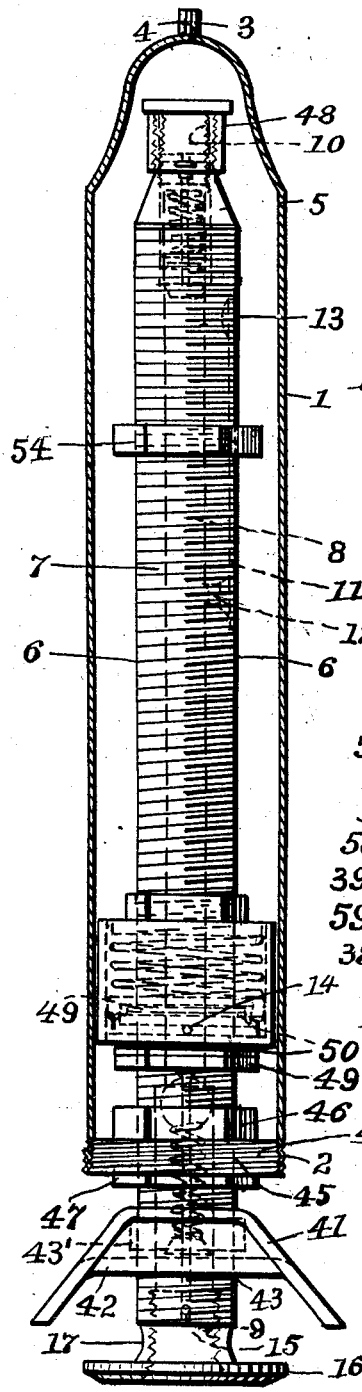
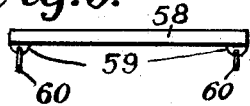
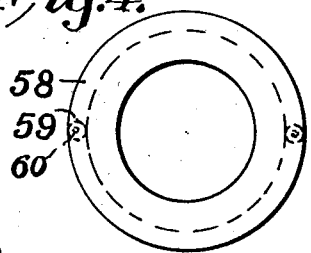
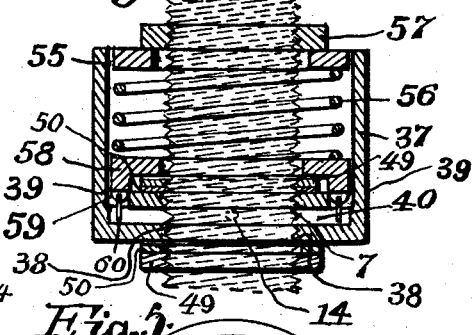
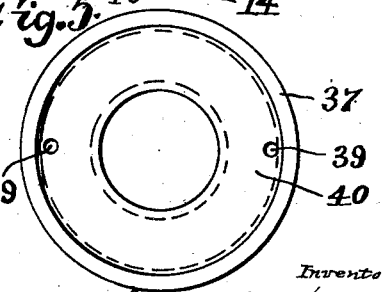

Patented Sept. 16, 1930

1,775,795

UNITED STATES PATENT OFFICE

JULE S. WILLCOX AND ALBERT M. WILLCOX, OF SAVANNAH, GEORGIA

SAFETY VALVE

Application filed June 11, 1925. Serial No. 36,438.

Our invention relates to safety valves, more particularly for use in connection with tires, tire valves, and tire pumps, and the like, where it is desired to avoid excessive pressure, so that when the same has reached a predetermined maximum point it is automatically relieved.

The object of the invention is to so construct the same that it may be easily and cheaply manufactured, will have few parts, will be effective in operation, and will be easy of manipulation.

In the drawings forming a part of this specification, and in which like symbols of reference represent corresponding parts in the several views:—

Figure 1 is a longitudinal view of our improved valve, showing the lower or connecting part of the same in detail.

Figure 2 is a view of the shell and the parts inclosed in the same for the exhaust valve;

Figure 3 is a side view of the valve which operates in the shell;

Figure 4 is a top view of the valve shown in Fig. 3; and

Figure 5 is a top view of the shell without its parts.

In the drawings, 1 represents a master cap; 2 the threaded end of the same; 3 a protrusion or extension on the cap, consisting of two posts formed around a slot 4. The extension is to straddle the offsets on the nuts which jam in place the two internal valves of the valve casing 5. The valve casing or housing 5 has a check valve at its upper and lower end to control the same, as well as vents leading through the walls, the vents being checked by proper valves which operate when the fluid has reached a predetermined pressure. 6 are the flat sides of the casing; 7 the threaded sides of the valve housing; and 8 a longitudinal recess in the valve housing. 9 and 10 are enlarged longitudinal recesses in the valve housing, at each end of the same for reception of the valves, and are threaded on said recessed surfaces; and 11 is a channel formed on the flattened surface of the valve housing for reception of a spring valve. 12 is a safety vent through the side walls of the valve housing, controlled by a valve and is located in proximity to or within the area of the channel indicated by character 11. This vent is slightly reamed and seated for a cut off. 13 is a slight depression in the valve housing sides and is employed for holding securely in place the tension adjustments. 54 is a tension nut for spring valve.

14 are vents through the sides of the valve housing for permitting the escape of gas or liquids beyond the limits of confinement; and 15 is a vent through the valve housing side for securing a pin within the longitudinal opening designated by 9. 16 is a base plate formed integral with the valve housing; and 17 is a turned down section of the valve housing for securing a close union with the storage receptacle.

37 is shell of exhaust valve, having threaded opening 38 to be received on housing. The shell is also provided with vents 39 forming valve seats in the same; and 40 is a recess or channel formed in the base of the shell, the same being connected directly with the vents 39. 41 is a plate for wedging or holding securely the assembled safety valve to the container under compression, 42 the circular top of same, and 43 the hole in the top and 43' nut to hold plate.

44 are the threads on the master cap lock; 45 a hole through the cap lock; and 46 nut formed integral with the cap lock, the same having an internal thread. 47 is a washer having a hole through the same. The washer is embedded in and extends beyond the surface of the master cap lock.

48 is a cap for the housing, the same having an internal thread and a milled head. 49 are jam nuts having gaskets 50 inserted within and extending beyond the surface of the nuts. These nuts and gaskets are on both sides of the shell and insure an air-tight joint.

55 is a hollow disk adapted to be received in the top of the shell 37, which forms the lower exit valve. The shell carries a spring 56, which is held in place by disk 55, and a nut 57 adapted to regulate the same. The spring 56 rests upon a base 58 having valves 59, which valves operate in the vents 39; and 60 are guides or pins connected to the valves.

The operation of the valve will be apparent from the foregoing description of the parts and their relation to each other. The two styles of valves shown will, of course, be capable of independent action, but their conjoint use is a great advantage from the additional security afforded by the same. The washer of the master nut will act to exert pressure on the automobile wheel rim after the valve has been passed through the opening in the same, by the adjustment of the combination of said master nut.

Having now fully described our invention, what we claim as new, and desire to secure by Letters Patent, is:—

A safety valve for attachment to a tire valve casing, comprising a cylindrical cup shaped member having a base with an opening threaded to fit the valve casing, an annular channel within said base, valve openings in the upper face of said base communicating with said channel, a spring pressed ring in the cup, said ring carrying valve plugs closing said valve openings, guide pins on said valve plugs, the valve casing having a drilled opening to admit air to the channel in the base when the member is positioned thereover, packed lock nuts above and below the base and threaded to the valve casing to make an air tight seal and hold the cup in position, and a screw-threaded nut engaging the casing above the spring to vary the pressure on the valves.

In testimony whereof we affix our signatures.

JULE S. WILLCOX.
ALBERT M. WILLCOX.